United States Patent [19]

Lehmler et al.

[11] Patent Number: 5,033,610

[45] Date of Patent: Jul. 23, 1991

[54] PROCESS FOR THE SUPPORT OF ROD-SHAPED WORKPIECES

[75] Inventors: Hans-Friedrich Lehmler, Bad Homburg; Gerhard Lentz, Niedernhausen; Gunter Wilkens, Kelkheim, all of Fed. Rep. of Germany

[73] Assignee: Messer Griesheim, Fed. Rep. of Germany

[21] Appl. No.: 282,199

[22] Filed: Dec. 9, 1988

[30] Foreign Application Priority Data

Dec. 12, 1987 [DE] Fed. Rep. of Germany ....... 3742174

[51] Int. Cl.$^5$ ............................................. B65G 13/12
[52] U.S. Cl. ................................... 198/782; 193/35 R
[58] Field of Search ...................... 198/780, 782, 824; 193/35 R, 42

[56] References Cited

U.S. PATENT DOCUMENTS

| | | | |
|---|---|---|---|
| 571,828 | 11/1896 | Conklin et al. | 193/35 R |
| 4,023,672 | 5/1977 | Haley | 193/35 R X |
| 4,422,543 | 12/1983 | Stubbings | 198/782 |

FOREIGN PATENT DOCUMENTS

| | | | |
|---|---|---|---|
| 0998631 | 10/1976 | Canada | 193/35 R |
| 2742072 | 10/1979 | Fed. Rep. of Germany . | |
| 2813461 | 10/1979 | Fed. Rep. of Germany . | |
| 3136394 | 3/1983 | Fed. Rep. of Germany . | |
| 3331844 | 1/1985 | Fed. Rep. of Germany . | |
| 3510381 | 4/1987 | Fed. Rep. of Germany . | |
| 3428139 | 9/1987 | Fed. Rep. of Germany . | |
| 3710916 | 10/1988 | Fed. Rep. of Germany | 193/35 R |
| 0085627 | 5/1982 | Japan | 198/782 |
| 0553168 | 4/1977 | U.S.S.R. | 193/35 R |
| 0608715 | 5/1978 | U.S.S.R. | 193/35 R |
| 1005086 | 9/1965 | United Kingdom | 198/782 |

*Primary Examiner*—Robert P. Olszewski
*Assistant Examiner*—James R. Bidwell
*Attorney, Agent, or Firm*—Connolly & Hutz

[57] ABSTRACT

A process for supporting rod-shaped workpieces shaped as U-, I-, L-, T- or bulb profiles includes placing the workpieces on support rollers of a longitudinal conveyor with their flanges or bulbs facing downward. The web surfaces and flanges of the workpieces contact elements fixed perpendicular to the support surface of the rollers.

10 Claims, 4 Drawing Sheets

PROCESS FOR THE SUPPORT OF ROD-SHAPED WORKPIECES

BACKGROUND OF INVENTION

The invention relates to a process for the support of rod-shaped workpieces which are placed on disc-shaped support rollers of a longitudinal conveyor.

In the hot treatment with a cutting torch, the workpieces are forwarded to the cutting area of a cutting station and positioned in this area in relation to the cutting torch.

The generic state of the art, according to German DE 2 83 461 A1 discloses the placement of slabs having a rectangular cross section on disc-shaped support rollers. In cutting the slabs with a torch, a cutting station travels along at the casting speed of the cast product. To prevent that the support rollers are then in harms' way of the cutting flame emerging from the cutting torch, the support rollers have to be movable on their axle by means of a suitable device when considerable deviations from a predetermined cutting path occur.

According to German DE 3 428 139 C2, the workpieces are shaped as T-, U-, I-, L-, flat or rounded profiles. For transport, these sections having different cross sections are placed in a carriage on section-receiving plates and the carriage is moved along a track into the cutting area.

In a section cutting installation according to German DE 3 510 381 C2, these sections are placed on a roller way with cylinder rollers extending over the entire section support surface. The sections are guided by contact rollers fixed perpendicular to the support surface, which are provided inside the support surface between the cylinder rollers of the roller way. The sections are positioned in a positioning device arranged at the end of the roller way between adjustable support rollers.

Such long T-, U-, I-, L-, flat or bulb sections, being unstraightened have lateral deviations over their length which aggravate a forwarding into the opening of the positioning device. During positioning in the positioning device, moreover, the profiles must be held in place at their free end.

German DE 2 742 072 A2, DE 3 331 844 C1, and DE 3 136 394 A1 disclose bore stations for sections in which the sections are also arranged on roller ways with cylinder rollers.

SUMMARY OF INVENTION

The invention is based on the objective of providing a position-stable support in forwarding the different section cross sections and section dimensions on one single longitudinal conveyor.

According to the invention, this objective is met in that the workpieces shaped as U-, I-, L-, T- or rounded profiles with flanges or bulbs facing downward are placed with their web surfaces on the disc-shaped support rollers and with the flanges are brought in contact with contact elements fixed perpendicular to the support surface of the disc-shaped support rollers along the longitudinal conveying direction.

The advantages achieved with the invention reside, in particular, in a position-stable conveying of the profiles. A "threading-in" in the opening of the positioning device is problem-free since only a predetermined lateral deviation is permitted as a result of the contact elements arranged beyond the support surface of the disc rollers in connection with their associated adjustable roller track. The support rollers of the positioning device can be advantageously eliminated.

THE DRAWINGS

FIG. 4a–5d are schematic illustrations of a U-, I-, T-, and rounded profile respectively; and FIG. 5 is an elevation view partly in section showing the mounting of a disc-shaped support roller.

DETAILED DESCRIPTION

Figure 1:
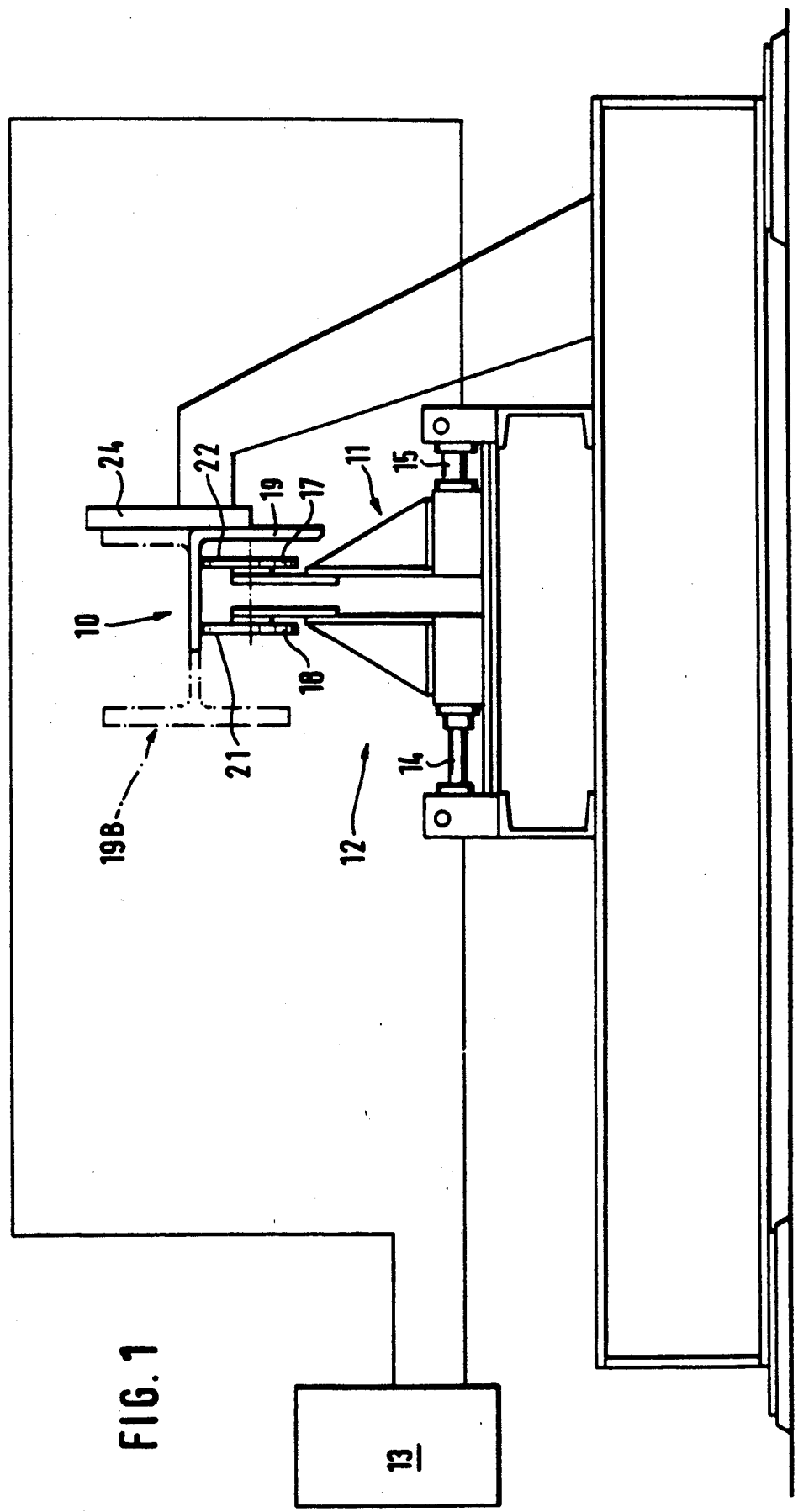
FIG. 1 is a front view of the roller way with disc-shaped support rollers to conduct the process.
Figure 2:
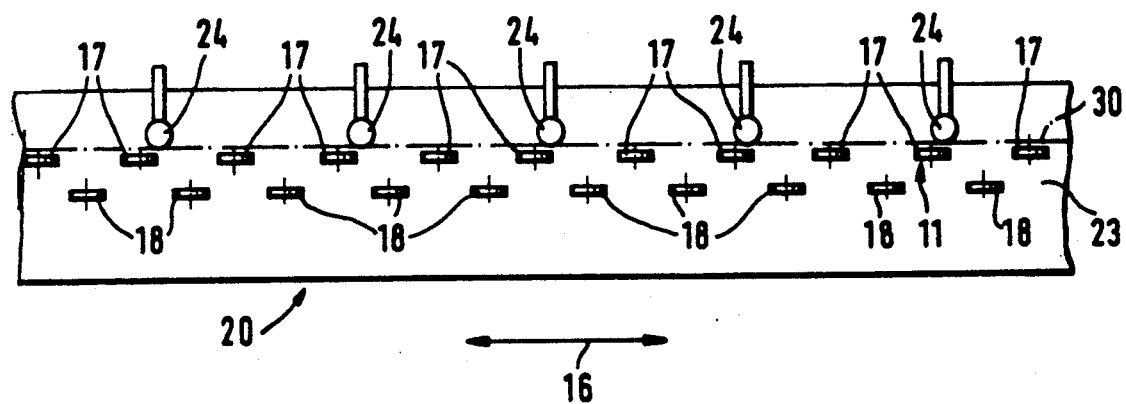
FIG. 2 is a cut-out of a plan view.

FIG. 1 and FIG. 2 schematically show a roller way 10 for the support of T-, U-, I-, L-, or bulb sections or profiles. The roller way 10 is a component of a section cutting system wherein the profiles are cut by a flame cutter. Roller way 10 and consists of two virtually parallel roller tracks 11, 12 which can be automatically adjusted perpendicular (direction of the arrow in 9 FIG. 3) to the longitudinal conveying direction 16 via a drive system 14, 15 connected with and suitable control 13 of the section cutting system for activating the drive system 14, 15 to transversely shift roller 18 and 17, respectively. The distance a (FIG. 3) between the disc-shaped support rollers 17, 18 arranged on the roller tracks 11, 12 is then increased or decreased. The control of each drive system 14, 15 transversely to the longitudinal conveying direction 16 takes place independently from each other.

Figure 3:
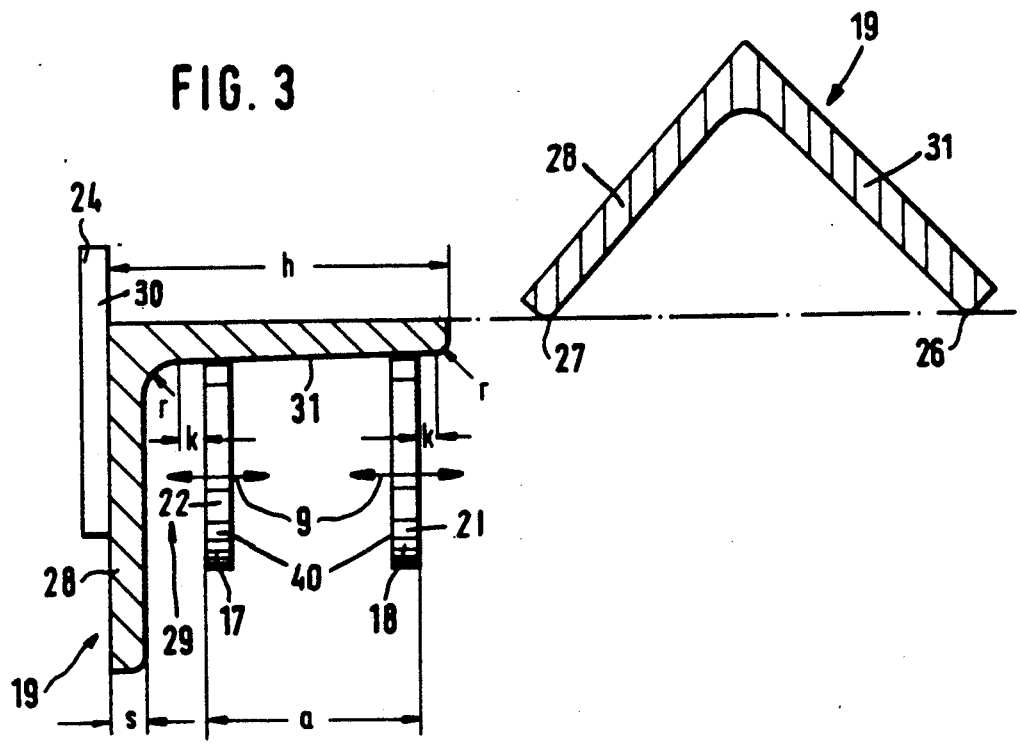
FIG. 3 is a L-profile (angle iron) arranged on the disc-shaped support rollers.
Figure 5:
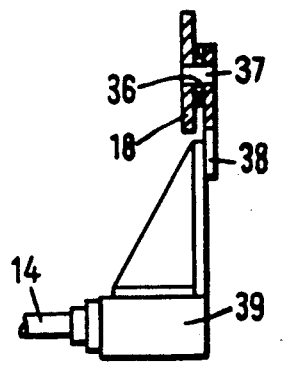

A plurality of disc-shaped support rollers 17, 18 is rotatably supported in bearings in a row on the adjacent roller tracks 11, 12 in the longitudinal conveying direction 16 of the profiles 19 (FIG. 3). FIG. 5 shows roller 18 mounted by bearings 36 to axle 37 on bracket 38 which is secured to bar 29. Bar 29 is transversely shiftable by its connection to drive system 14. Roller 17 would be similarly mounted. When supported in this way, the disc-shaped support rollers 17, 18 with their outside surfaces 21, 22 face a side 40 away from the support side and form a lateral closed surface. Components such as axles 37 do not protrude from these outside surfaces 21, 22 of the support rollers 17, 18 beyond the measure s+r (FIG. 3) to be explained below. The support rollers 17, 18 of the roller tracks 11, 12 are arranged offset (FIG. 2) in longitudinal conveying direction 16 with respect to each other in a base frame 20. This arrangement provides for the advantageous association of the support rollers 17, 18 at any desired small distance from each other so that the smallest section heights h can be positioned.

Beyond the maximum adjustable distance a, contact elements 24, in particular, contact rollers are fixed next to the roller track 11 perpendicular to the support width 23 (i.e. maximum distance a) of the disc-shaped support rollers 17, 18.

The contact elements 24 are then arranged in such a way that the disc-shaped support rollers 17 with maximum distance a to the support rollers 18 fastened on the opposite roller track 12 with their outside surface 22 can be brought in contact with the contact elements 24.

In operation, a U-, I-, T-, L-, or bulb section or profile is placed on the support surface of the disc-shaped support rollers 17, 18 via a suitable transverse conveyor, not shown in more detail. The L-profile 19 shown in FIG. 3 (L-section) is then forwarded horizontally to the disc-shaped support rollers 17, 18 arranged on both front faces 26, 27. As shown in FIG. 3, the transverse conveying of the L-section 19 is finished when the flange 28 of the section 19 associated with the front face 27 comes in contact with the contact elements 24. The transverse conveyor is then lowered and the L-profile 19 with its flange 28 is lowered in the intermediate space 29 formed between the contact elements 24 and the disc-shaped support roller 17. The lateral dimension of the intermediate space 29, based on the contact surface 30 (FIG. 2) of the contact elements 24, is automatically determined by the control 13 from the addition of the flange width s or, for a bulb section 4d, of the width of the curvature and the radius r. This lateral minimum dimension of the intermediate space 29 can be adjusted with the support rollers 17 before the profile 19 is set in place by controlling the roller track 11. In order to obtain an as large as possible support width 23 of the profiles 19 on the disc-shaped support rollers 17, 18, the distance a between the outside surfaces 21, 22 of the support rollers 17, 18 is determined by the control 13 as a result of reducing the profile height h by the appropriate flange width s or the curvature width and the radii r. According to another refinement of the process for supporting the sections 19, the distance a between the outside surfaces 21, 22 of the disc-shaped support rollers 17, 18 is additionally reduced by the control 13 by an amount k which depends on the appropriate profile height h. As a result of this measure finishing tolerances and flextions of the section 19 are advantageously compensated for so that these sections are always lowered in the intermediate space 29 with flanges 28 facing down on the support rollers 17, 18a and are placed with their web surface 31 on the support rollers 17, 18.

Figure 4A:
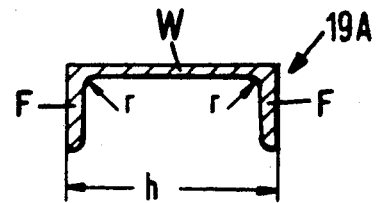
Figure 4B:
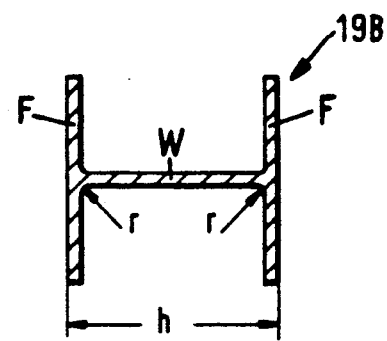
Figure 4C:
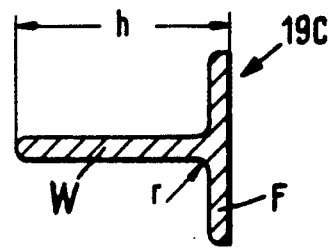
Figure 4D:
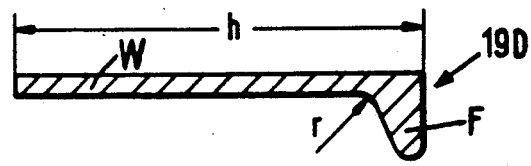

In the present exemplified embodiment, the process according to the invention was described by means of an L-section 19. Basically, this process can also be employed for U-, I-, T-, or bulb sections so that all sections required in the section-processing industry, according to this process, can be supported on one single longitudinal conveyor. The above cited are schematically shown in FIG. 4a, b, c, d whereby FIG. 4a shows a U-profile 19A, FIG. 4b an I-profile 19B, FIG. 4c a T-profile 19C and FIG. 4d a bulb profile 19D. Each of these profiles has a web W and a flange F. FIG. 1 also shown I-profile 19B in phantom.

SUMMARY

The invention relates to a process for the support of rod-shaped workpieces which are placed on movable disc-shaped support rollers 17, 18 of a longitudinal conveyor.

In order to provide a position-stable support in conveying the different sections and section dimensions on one single longitudinal conveyor, the workpieces shaped as U-, I-, L- T-, or bulb profiles, with flanges 28 or bulbs facing downward are placed on the disc-shaped support rollers 17, 18 with their web surfaces 31 and with the flanges 28 are brought in contact with contact elements 24 fixed perpendicular to the support surface of the disc-shaped support rollers 17, 18 along the longitudinal conveying direction.

What is claimed is:

1. In a process for the support of rod-shaped workpieces which are placed on disc-shaped support rollers of a longitudinal conveyor, the improvement being in that two parallel roller tacks are provided with the support rollers comprising a plurality of rollers in each of the roller tracks, each of the roller tracks being independently movable toward and away from the other roller track to control the combined support width of the two roller tracks, the workpieces which are shaped as U-, I-, L-, T, or the bulb profiles with flanges extending downwardly from the web surfaces wherein the profiles are loosely placed on the disc-shaped support rollers without any clamping to the rollers with the web surfaces loosely supported on the rollers and with the flanges brought in contact with contact elements fixed perpendicular to the support surface of the disc-shaped support rollers along the longitudinal conveying direction of the rollers and the flanges being located between the contact elements and the support rollers disposed against contact surfaces on the contact elements which contact surfaces are parallel to the support rollers.

2. Process according to claim 1, characterized in that the disc-shaped support rollers in the longitudinal conveying direction of the sections are successively arranged each time on one of two adjacent roller tracks which are adjustable perpendicular to the longitudinal conveying direction.

3. Process according to claim 2, characterized in that the support rollers of the roller tracks are arranged offset with respect to each other in the longitudinal conveying direction.

4. Process according to claim 3, characterized in that the profiles are placed with a large support width on the disc-shaped support rollers and the distance between the outside surfaces of the disc-shaped support rollers comprising the support width is adjusted by a control in reducing the stored amount of the section height of the profile by the appropriate flange or curvature widths and the radii.

5. Process according to claim 4, characterized in that the distance between the outside surfaces of the disc-shaped support rollers is reduced by the control by an amount which depends on the section height.

6. Process according to claim 2, characterized in that the profile are placed with a large support width on the disc-shaped support rollers and the distance between the outside surfaces of the disc-shaped support rollers comprising the support width is adjusted by a control in reducing the stored amount of the section height of the section by the appropriate flange or bulb widths and the radii.

7. Process according to claim 1, characterized in that the sections are placed with a large support width on the disc-shaped support rollers and the distance between the outside surfaced of the disc-shaped support rollers determining the support width is adjusted by a control in reducing the stored amount of the section height of the section by the appropriate flange or bulb widths and the radii.

8. Process according to claim 1, characterized in that the support rollers of the roller tracks are arranged offset with respect to each other in the longitudinal conveying direction.

9. In an apparatus for supporting rod-shaped workpieces of U-, I-, L-, T-, or bulb profiles having flanges extending downwardly from web surfaces wherein the profiles are on disc-shaped support rollers of a longitudinal conveyor, the improvement being in that said conveyor includes two roller tracks with said disc-shaped support rollers rotatably mounted in bearing, and two drives for moving independently the roller tracks perpendicular to the longitudinal conveying direction to selectively move the tracks toward and away from each other to control the combined support width of said two rollers tracks, contact elements being mounted perpendicular to and spaced from but adjacent to said rollers on one of said roller tracks, said contact elements having contact surfaces parallel to said rollers whereby the web of a profile may be mounted on and supported by said rollers with the flange of the profile disposed between said contact surfaces and their adjacent rollers and in contact with said surfaces.

10. Apparatus according to claim 9 characterized in that said rollers of each of said tracks is transversely offset with respect to said rollers of the other of said tracks.

* * * * *

UNITED STATES PATENT AND TRADEMARK OFFICE
CERTIFICATE OF CORRECTION

PATENT NO. : 5,033,610
DATED : July 23, 1991
INVENTOR(S) : Hans-Friedrich Lehmler, et al It is certified that error appears in the above-indentified patent and that said Letters Patent is hereby corrected as shown below:

On the title page, Item [73]: Assignee: should read --Oxytechnik Ges. Fur Systemtechnik MBH--;

Signed and Sealed this

Twenty-sixth Day of July, 1994

Attest:

BRUCE LEHMAN

Attesting Officer      Commissioner of Patents and Trademarks